(12) United States Patent
Stevens

(10) Patent No.: US 6,913,086 B2
(45) Date of Patent: Jul. 5, 2005

(54) SKIMMER

(76) Inventor: Timothy J. Stevens, 145 8th St. SW., Buffalo, MN (US) 55313

( * ) Notice: Subject to any disclaimer, the term of this patent is extended or adjusted under 35 U.S.C. 154(b) by 121 days.

(21) Appl. No.: 10/230,022

(22) Filed: Aug. 28, 2002

(65) Prior Publication Data

US 2004/0040725 A1 Mar. 4, 2004

(51) Int. Cl.$^7$ .................................................. E02F 3/76
(52) U.S. Cl. ........................... 172/815; 37/410; 37/444; 172/19; 172/817
(58) Field of Search ........................... 172/19, 20, 815, 172/817, 787, 791, 786, 195, 197, 199, 684.5; 37/302, 444, 410, 411; 171/67, 45

(56) References Cited

U.S. PATENT DOCUMENTS

| | | | | |
|---|---|---|---|---|
| 2,203,713 A | * | 6/1940 | Austin | 37/418 |
| 3,576,214 A | * | 4/1971 | Ratcliffe | 172/393 |
| 4,056,328 A | * | 11/1977 | Maxey | 404/96 |
| 4,568,219 A | * | 2/1986 | Berry | 404/118 |
| 4,749,048 A | | 6/1988 | Kelly | |
| 4,924,945 A | | 5/1990 | Mork | |
| D335,131 S | | 4/1993 | Devaney | |
| 5,211,247 A | | 5/1993 | Johnsen | |
| D358,401 S | | 5/1995 | Devaney | |
| 6,035,562 A | | 3/2000 | Virnig et al. | |
| 6,347,670 B1 | * | 2/2002 | Miskin | 172/199 |

* cited by examiner

Primary Examiner—Victor Batson
(74) Attorney, Agent, or Firm—Craig Gregersen

(57) ABSTRACT

Apparatus and method for shearing a soil layer and removing it is provided. An apparatus in accord with the present invention has a frame mounting a shearing blade reciprocally movable substantially vertically into an operational position where the shearing blade will extend below the ground surface to shear the layer of soil above the shearing blade from the soil beneath it. An apparatus will also have a pushing blade mounted for use in pushing sheared soil. In a method in accord with the present invention, apparatus is provided that includes a shearing blade and a pushing blade. Each of the blades is positionable in operational and non-operational positions. The pushing blade is placed in its non-operational position and the shearing blade is placed in the operational position and is used to shear an upper layer of soil to a desired depth to produce a sheared soil layer and to create a new surface layer below the sheared soil layer. The shearing blade is then placed in its non-operational position and the pushing blade is placed in its operational position and is used to push the sheared soil layer off the new surface layer.

22 Claims, 4 Drawing Sheets

SKIMMER

The present invention relates generally to apparatus and method useful in preparing soil for landscaping and particularly to an apparatus and method useful for loosening topsoil, including turf, for removal to a variable depth as desired and then to removing such loosened topsoil.

BACKGROUND OF THE INVENTION

Landscaping a site involves multiple tasks to prepare it for the desired plantings. Where a site is covered with plantings already, such as a lawn that is being prepared for a new landscaping design, removal of the sod, often in large measures, is usually necessary. This sod usually will not be reused, so removal with its preservation in mind is not required.

Several different devices exist for this purpose, each with its own shortcomings. Often, the sod/upper soil layer is simply bladed off using a blade attached to a skid-steer loader, tractor, or other similar motive power source. At other times a bucket attached to such a motive power source may be used to remove the top soil layer. Removal of the sod in this manner with a blade or bucket, however, often results in an uneven landscape requiring substantial reworking later because one side of the blade or bucket will almost invariably dig into the ground deeper than the other side will. The result, then, is a gouge that must be corrected with additional reworking of the top soil layer to smooth the surface.

An additional shortcoming of the present devices relates to the manner in which a site must be worked using them. Using the presently available devices both to separate the soil layer and to simultaneously move it takes a substantial amount of power. The equipment operator is limited to working only small patches of the surface at a time since once a certain amount of soil has been accumulated in front of the blade or bucket, loader or tractor will be unable to both shear the soil layer and push the sheared soil. The separated soil and foliage must be removed to a pile for subsequent handling and disposal. Then, the operator must go back and start again where he left off. At least in part because of this, removal of the top soil layer and plantings can take a considerable amount of time as the operator is required to traverse the same ground over and over again.

It would be desirable to have an apparatus both for the selective separation of the top layer of soil and foliage to a desired depth and for the subsequent removal of the separated layer.

BRIEF DESCRIPTION OF THE INVENTION

It is an object of the present invention to provide new and useful apparatus that is not subject to the previously mentioned disadvantages.

It is another object of the present invention to provide new and useful apparatus for removing the top layer of soil to a desired depth and for subsequent removal of the soil layer.

It is still another object of the present invention to provide new and useful apparatus for use with skid-steer loaders, tractors or other motive devices that enable the operator separately to shear the top soil layer to a desired depth from the soil layers below and subsequently to remove such sheared top soil layer.

It is yet another object of the present invention to provide new and useful apparatus The foregoing objects of the present invention and others that will be apparent to those skilled in the art are provided by an apparatus that is removably mountable to a skid-steer loader, tractor, or other motive power source. An apparatus in accord with the present invention may have a frame mounting a shearing blade for reciprocal movement into and out of the soil and a pushing blade for pivotal movement. The shearing and pushing blades are mounted for relative motion such that when one blade is in its operational position the other is in its non-operational position and vice-versa. An appropriate linkage mechanism activated by an appropriate power source moves the blades between their operational and non-operational positions.

Thus, an apparatus and method in accord with the present invention may include a pair of landscaping tools alternately engageable by an operator for shearing a soil layer to a desired depth using one of the tools and then removing the sheared soil layer with the other tool.

In the embodiment of the present invention shown and described herein, a skimmer in accord with the present invention has a frame including a pair of spaced apart frame side walls having skid plates mounted to the bottom edges thereof. The frame side walls mount therebetween a shearing blade apparatus. The shearing blade apparatus is formed in part from a pair of opposed shearing blade end plates and a dual cutting edge shearing blade disposed therebetween. The shearing blade apparatus is reciprocally moved substantially vertically with each of the shearing blade end plates moving between a pair of spaced apart guides attached to the interior surface of the frame side walls. In its operational position, the shearing blade will be lowered such that it extends below the skid plates and is movable at a desired depth below the ground surface to shear the layer of soil above the shearing blade from the soil beneath it. The skid plates operate to inhibit one side of the shearing blade from digging into the ground at a depth below the other side. A skimmer as shown here will also have a pushing blade mounted for pivotal motion in front of the skimmer frame. An activation linkage extending between the shearing blade apparatus and the pushing blade is used to move the shearing and pushing blades between their operational and non-operational positions.

The present invention further contemplates a method for removing a top soil layer, including plantings. In a method in accord with the present invention, apparatus is provided that includes a shearing blade and a pushing blade. Each of the blades is positionable in operational and non-operational positions. The pushing blade is placed in its non-operational position and the shearing blade is placed in the operational position and is used to shear an upper layer of soil to a desired depth to produce a sheared soil layer and to create a new surface layer below the sheared soil layer. The shearing blade is then placed in its non-operational position and the pushing blade is placed in its operational position and is used to push the sheared soil layer off the new surface layer.

These and other objects, advantages, and features of an embodiment of the present invention will be appreciated by those skilled in the art when the following drawings are considered in conjunction with the accompanying text description.

DETAILED DESCRIPTION OF THE INVENTION

Figure 1:
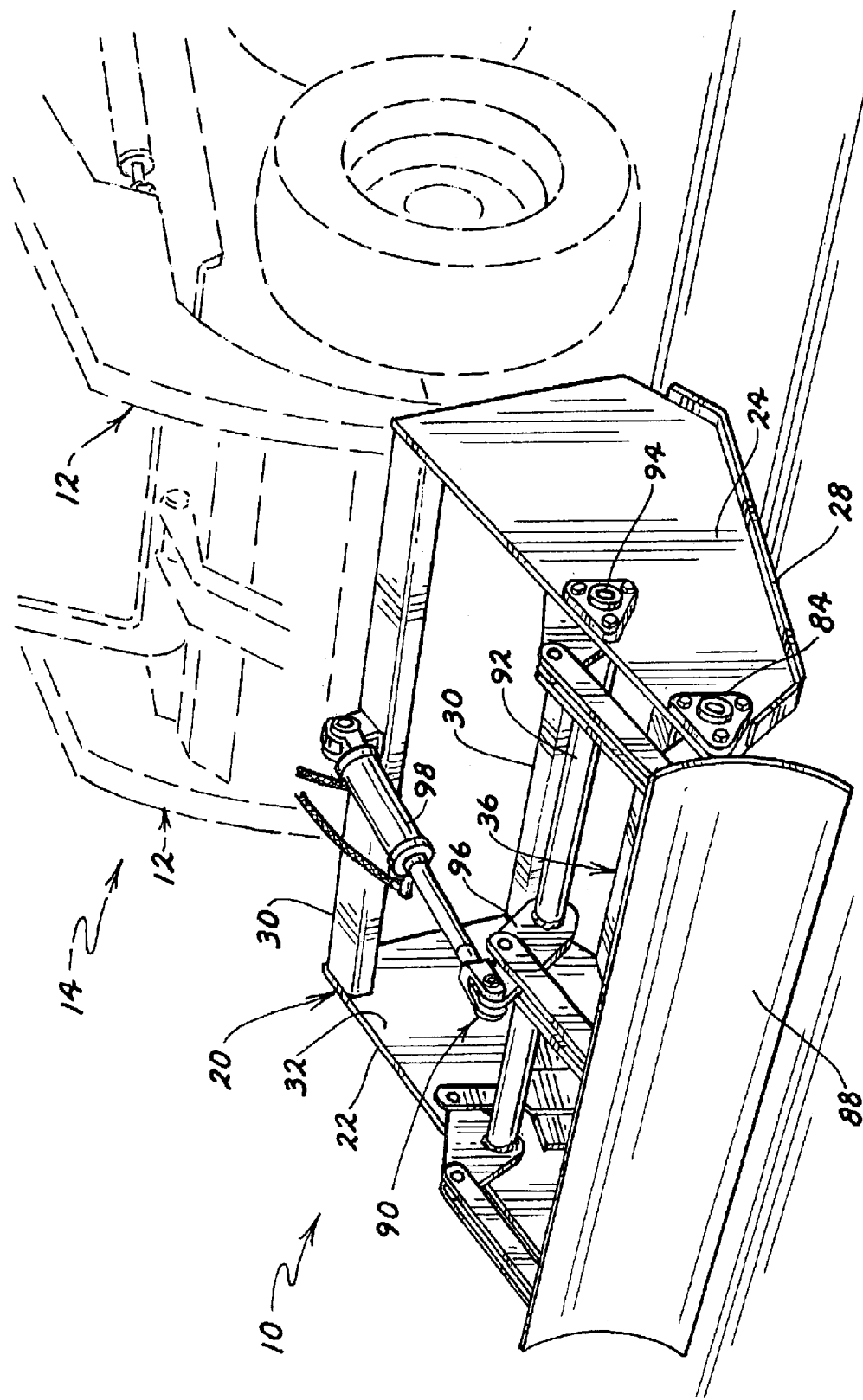
FIG. 1 shows an embodiment of the present invention in a perspective view attached to a skid steer loader, which is shown partially in phantom outline.
Figure 2:
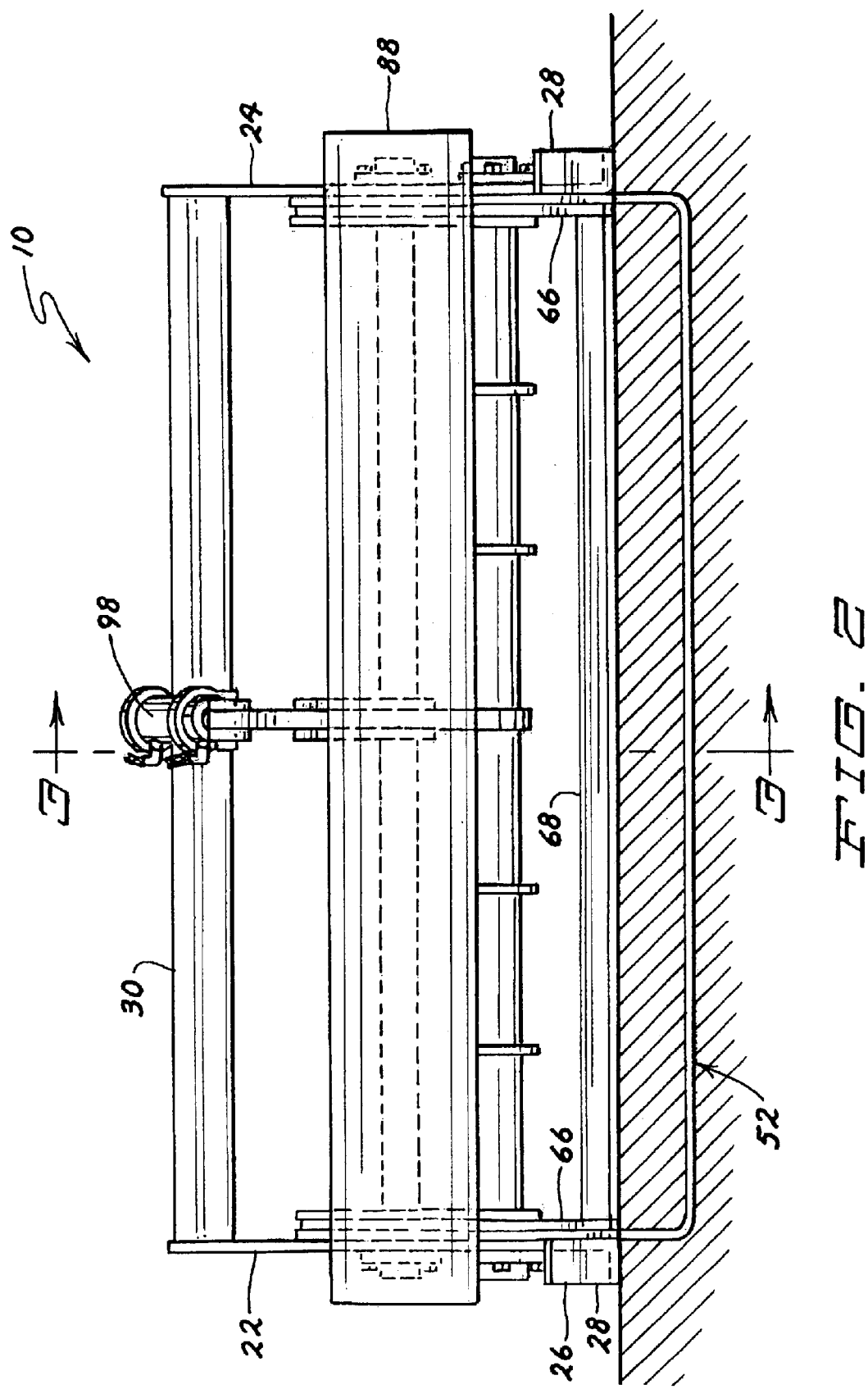
FIG. 2 illustrates the embodiment of the present invention shown in FIG. 1 in a front elevation view.

FIG. 1 illustrates in a perspective view an embodiment 10 of the present invention, referred to hereafter as a "skimmer," for separating the top layer of soil to a desired depth and removing it. Skimmer 10 is shown attached, by way of example only, to the arms 12 of a skid-steer loader 14 by means of attachment brackets 16, illustrated in phantom outline in FIG. 2. Brackets 16 may be of the type typically provided for standardized attachment to a motive power source, such as a skid-steer loader, tractor or other motive power source. Skimmer 10 includes a frame 20 comprising a pair of spaced apart frame side walls 22 and 24. Each frame side wall 22, 24 includes a skid plate 26, 28, respectively, attached to the bottom edges thereof. Side walls 22 and 24 may be supported in a spaced apart relationship by one or more support members 30 attached to and extending between the interior surfaces 32 and 34, respectively, thereof.

Frame 20 may further include one or more stabilizer members 36 attached to and extending between the interior surfaces 32 and 34. Stabilizers 36 may perform multiple functions, including aiding in the prevention of the frame 20 from tilting to the side as one side tries to dig into the ground more than the other during operation of the skimmer 10. Additionally, stabilizers 36 may function as leveling bars, aiding in the smoothing of a surface to be landscaped. Each stabilizer 36, as shown in the present embodiment, may have a generally trapezoidal configuration, including top and bottom surfaces 38 and 40 and front and rear surfaces 42 and 44. This configuration, in essence, provides a front and rear blade to aid in leveling of a surface in that the a cutting edge is formed on both the front and rear sides to cut high spots in the surface.

The skimmer 10 also includes a shearing blade apparatus 50. Apparatus 50 comprises a shearing blade 52. As shown in the Figures, blade 52 has a generally trapezoidal configuration, including top and bottom surfaces 54 and 56 and front and rear surfaces 58 and 60. It will be appreciated that the intersections of the bottom surface 56 and the front surface 58 provides a front cutting edge 62 and that the intersection of the bottom surface 56 and the rear surface 60 provides a rear cutting edge 64.

Blade 52 is supported at its ends by shearing blade end plates 66, which may be formed integrally therewith or manufactured separately from the blade 52 and attached thereto in any known manner, such as by welding. A shearing blade support member 68, shown as an angle iron, is attached to and extends between the end plates 66 to provide stability and aid in the prevention of the blade from twisting during operation.

Each frame side wall 22, 24 of frame 20 includes a pair of guide plates 70 attached to its inner surface 32, 34, respectively. Guide plates 70 are spaced apart to slidably receive therebetween a shearing blade end plate 66. Thus, comparing FIGS. 3 and 4, it will be observed that as the shearing blade 52 is raised and lowered, the end plates 66 slide between the guide plates 70.

Figure 3:
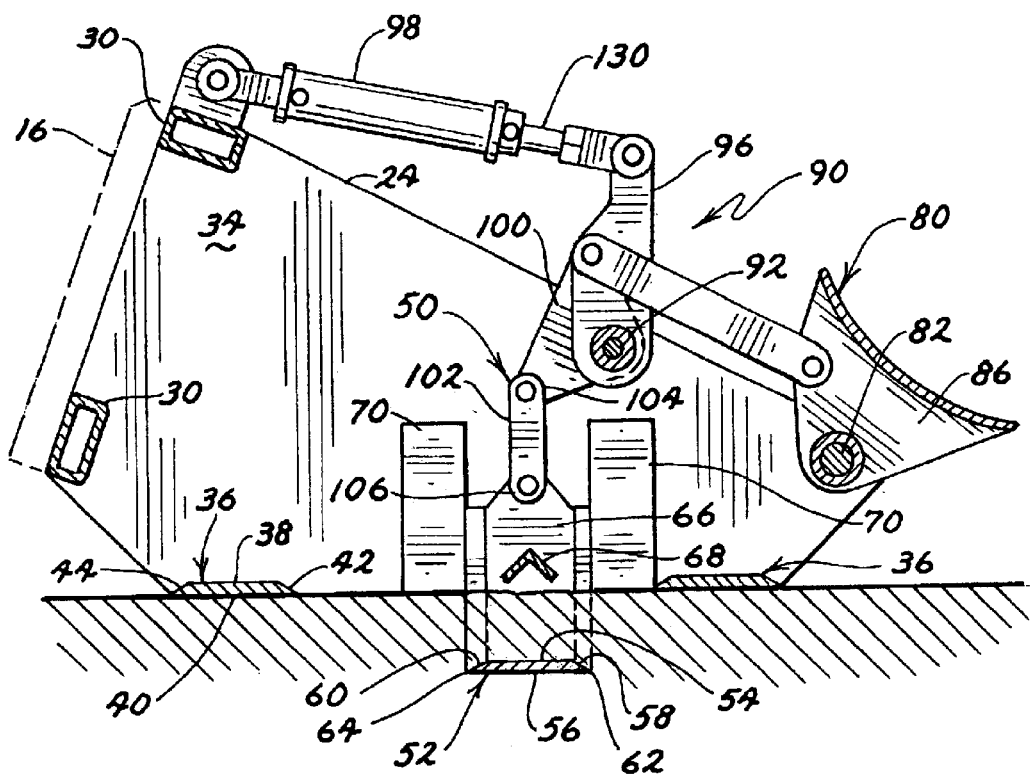
FIG. 3 depicts the embodiment of the present invention shown in FIG. 1 in a cross sectional, side elevation view, taken along viewing plane 3—3 of FIG. 2, with the skimming tool shown in operational position.
Figure 4:
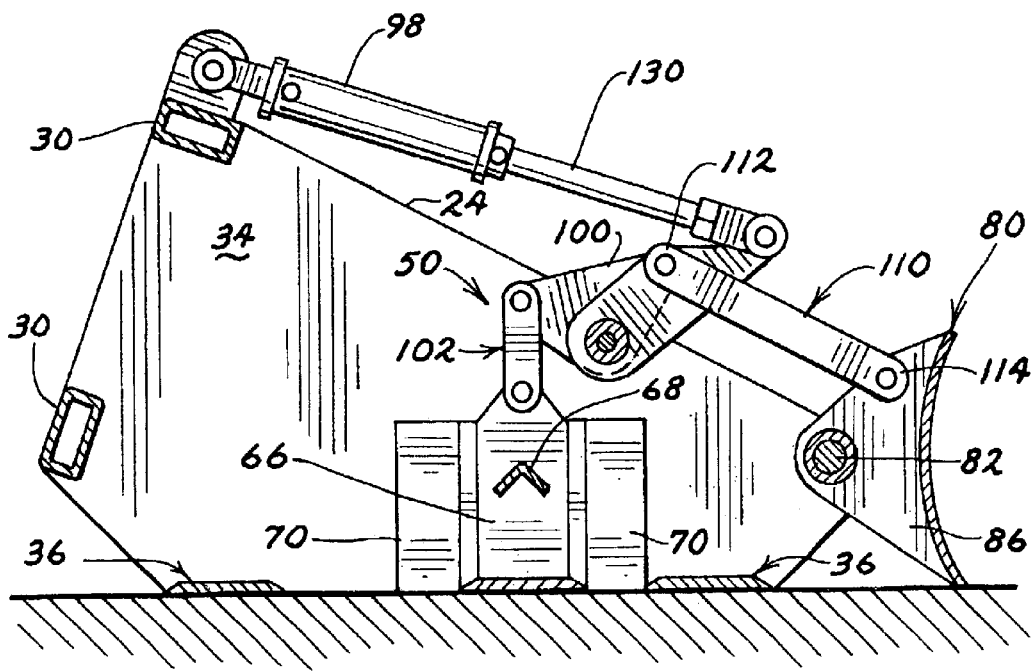
FIG. 4 shows the embodiment of the present invention shown in FIG. 1 in a cross sectional, side elevation view with the blade in operational position.

Skimmer 10 also includes a pushing blade 80, which is mounted for pivotal motion between the frame side walls 22 and 24. The pushing blade 80 is spaced forwardly of the shearing blade 52. The pushing blade may be placed in a non-operational position as shown in FIG. 3 or in an operational position as shown in FIG. 4. The pushing blade is mounted for pivotal motion by an axle 82 that extends between the side walls 22 and 24. The axle 82 is mounted for rotational motion relative to the side walls by appropriate bearings 84, which are attached to the side walls. The pushing blade 80 includes a plurality of attachment ears 86 that extend rearwardly from the blade pushing surface 88

As previously mentioned, both blades 52 and 80 can be placed in operational and non-operational positions. A single blade selection and activation apparatus 90 is used to alternately place one blade in an operational position and the other in a non-operational position. Apparatus 90 includes a shaft 92 that is mounted for rotation to the side walls 22 and 24. Appropriate bearings 94 may be used to assist the rotation of the shaft 90. A rocker arm 96 is attached the shaft 90 and extends upwardly therefrom. An hydraulic cylinder 98 is attached to the rocker arm 96 at one end and at the other to the upper support beam 30 in known manner.

Non-rotationally attached to the shaft 92 at each end thereof is a rocker member 100. As illustrated, the rocker member 100 has a substantially triangular configuration. One corner of the rocker member 100 is fixedly attached to the shaft 92 so that it will rotate as the shaft rotates. Another corner of the rocker member 100 is attached to a shearing blade link member 102 at an end 104 thereof. The other end 106 of shearing blade link member 100, which takes the form of a bar as shown in the embodiment illustrated herein, is attached to the shearing blade end plate 66. Attached to the third corner of the rocker member 100 is a pushing blade linkage 110. As illustrated, linkage 110 comprises a pair of bars attached at one end 112 on opposite sides of the rocker member 100. The linkage 100 is attached at its other ends 114 to the attachment ears 86 of the blade 80. In addition to the linkages 100 attached to the rocker members 100, a third linkage member 120 may be advantageously attached to the rocker arm 96 and to the pushing blade 80.

Referring specifically to FIGS. 3 and 4 it will be observed that when the piston 130 of the hydraulic cylinder 98 is retracted, that the rocker arm 96 is rotated to its most rearward position. This rearward rotation pulls the linkages 110 rearwardly, causing the blade 80 to pivot rearwardly into its non-operational position as shown in FIG. 3. As the rocker arm 96 rotates rearwardly about the shaft 92, the corner of rocker member 100 attached to the shearing blade link member 102 is rotated downwardly, causing the attached link member to move downwardly and in turn pushing the shearing blade 52 downwardly below the bottom of the frame 20. The depth of the blade below the bottom of the frame 20 can be controlled by the operator by noting how far the piston 130 is retracted. Thus, retraction of the piston 130 acts to place the pushing blade 80 into its non-operational position and the shearing blade 52 into its operational position.

When the piston 130 is extended as shown in FIG. 4, then the rocker arm 96 is rotated forwardly, pushing the linkages forward and causing the blade 80 to pivot downwardly into its operational position as shown. Similarly, extension of the piston 130 causes the corner of the rocker member 100 attached to the shearing blade link member 102 to rotate upwardly, pulling the link member 100 and the shearing blade 52 therewith. Thus, extension of the piston 130 acts to place the pushing blade 80 into its operational position and the shearing blade 52 in its non-operational position.

Figure 5:
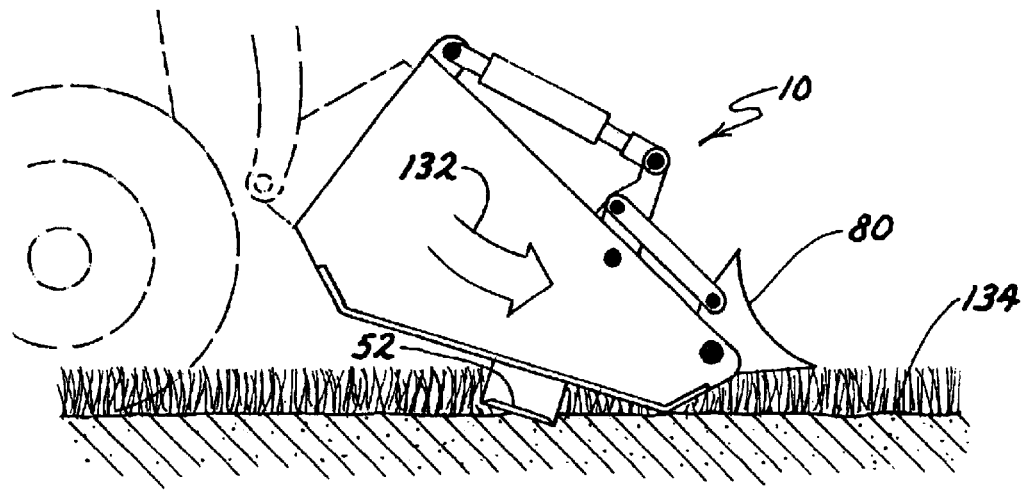
FIG. 5 shows the embodiment of the present invention shown in FIG. 1 with the shearing blade lowered into operational position to begin digging into the ground, with the skimmer disposed so as to allow the shearing blade to begin cutting.
Figure 6:
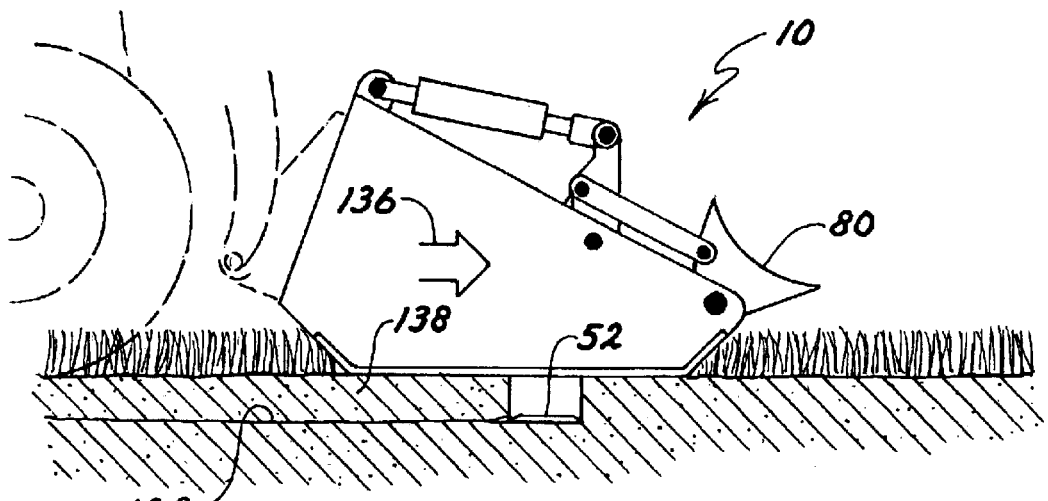
FIG. 6 shows the embodiment of the present invention shown in FIG. 1 with the shearing blade slicing an upper soil layer from the soil below.
Figure 7:
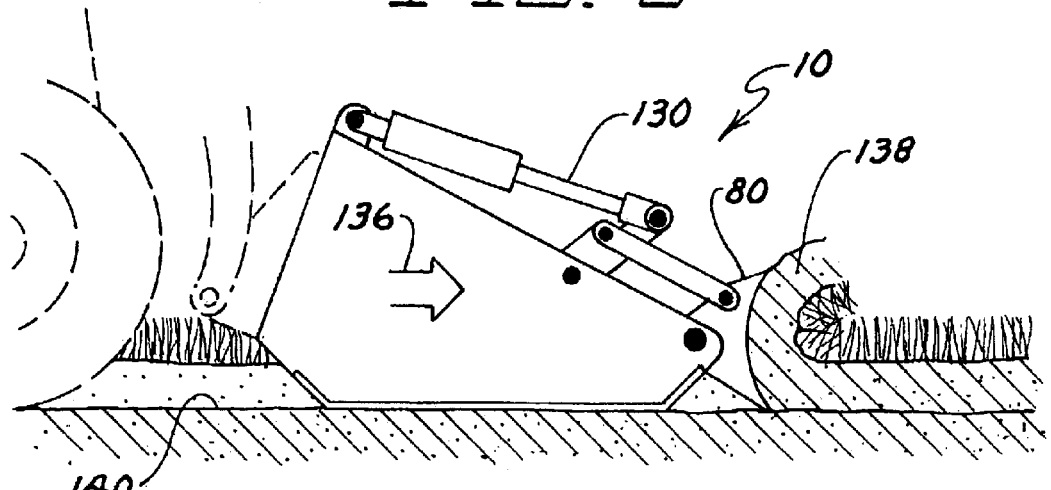
FIG. 7 shows the embodiment of the present invention shown in FIG. 1 with the shearing blade in its non-operational position and the pushing blade in the operational position and pushing the previously sheared upper soil layer off the soil below.

Referring now to FIGS. 5–7, the operation of the present invention will be explained. As illustrated in FIG. 5, the skimmer 10 has been tilted relative to the ground surface such that the front thereof, but not the bottom, is engaging the ground surface. The shearing blade 52 has been placed in its operational position and the pushing blade 80 in its non-operational position. The loader 14 is then moved forwardly as indicated by the arrow 132 such that the shearing blade begins to dig into the ground 134.

Referring to FIG. 6, the operator of the loader 14 has leveled the skimmer 10 relative to the ground 134 and is pushing the skimmer 10 forwardly as indicated by the arrow 136. As the blade 52 moves through the ground, it shears off the layer 138 above the blade from the soil beneath, creating a new surface 140 as it does so. It will be understood that the dual cutting edge on the blade 52 also allows the operator to back up and pull the shearing blade 52 through the ground rather than push it as illustrated in the Figure.

FIG. 7 illustrates the skimmer 10 with the shearing blade 52 retracted into its non-operational position and the pushing blade 80 pivoted into its operational position by the extension of the piston 130. The operator is using the blade 80 to push the sheared soil layer 138 off the new surface 140, clearing it for further landscaping operations.

An advantageous feature of the present invention is that lower edge 142 of the blade 80 is at the same level as the bottom of the frame and the shearing blade 52 when the pushing blade 80 is in its operational position. This helps prevent the pushing blade from digging into the ground and in pushing the sheared soil layer off the newly created surface 140.

The present invention having thus been described, other modifications, alterations, or substitutions may now suggest themselves to those skilled in the art, all of which are within the spirit and scope of the present invention. By way of example only, other mechanisms could be used in lieu of hydraulic cylinder 72, such as an air cylinder, linear actuator, or other known mechanical or electrical actuators. Also, the present invention has been illustrated herein with an embodiment wherein a mechanical linkage is used to alternately dispose the shearing and pushing blades in their operating positions. However, other known forms of providing motion, such individually actuated hydraulic cylinders or linear actuators or other devices known to the art could be used to alternately place the blades in their operational and non-operational positions and thus the physical linkage between them as shown herein could be obviated. It is therefore intended that the present invention be limited only by the scope of the attached claims below.

What is claimed is:

1. A skimmer comprising:
    a frame including a pair of side walls;
    a shearing blade mounted by said frame side walls for substantially vertical, reciprocal motion relative to said frame side walls; and
    a pushing blade mounted by said frame side walls for reciprocal pivotal motion relative to said frame side walls,
wherein said shearing blade is positionable in the ground for shearing the soil above the blade from the soil beneath said blade to create a sheared soil layer while leaving the sheared soil layer substantially in place.

2. The skimmer of claim 1 and further including means for mounting said skimmer to a motive power source.

3. The skimmer of claim 1 and further including means for alternately disposing said shearing blade in operational and non-operational positions.

4. The skimmer of claim 3 and further including means for alternately disposing said pushing blade in operational and non-operational positions.

5. The skimmer of claim 3 and further including means for alternately disposing said pushing blade in an operational position when said shearing blade is in its non-operational position and for disposing said pushing blade in its non-operational position when said shearing blade is in its operational position.

6. The skimmer of claim 3 wherein each of said frame side walls includes a bottom edge and further includes a skid plate attached to said bottom edge of said frame side wall.

7. The skimmer of claim 1 wherein said shearing blade comprises at least bottom, front and rear shearing blade surfaces and wherein the intersection of the front and bottom shearing blade surfaces provides a front cutting edge and the intersection of the rear and bottom shearing blade surfaces provides a rear cutting edge.

8. The skimmer of claim 7 wherein said shearing blade further includes a top surface.

9. The skimmer of claim 8 wherein said shearing blade has a substantially trapezoidal configuration.

10. The skimmer of claim 9 wherein said shearing blade has a substantially trapezoidal configuration.

11. A skimmer comprising:
    a frame including a pair of side walls;
    a shearing blade apparatus including a shearing blade, said shearing blade mounted by said frame side walls for substantially vertical, reciprocal motion relative to said frame side walls, said shearing blade comprising at least bottom, front and rear shearing blade surfaces, wherein the intersection of the front and bottom shearing blade surfaces provides a front cutting edge and the intersection of the rear and bottom shearing blade surfaces provides a rear cutting edge; and
    a pushing blade apparatus including a pushing blade, said pushing blade mounted by said frame side walls for reciprocal pivotal motion relative to said frame side walls,
wherein said shearing blade is positionable in the ground for shearing the soil above the blade from the soil beneath said blade to create a sheared soil layer while leaving the sheared soil layer substantially in place.

12. The skimmer of claim 11 wherein said shearing blade includes a pair of ends and said shearing blade apparatus includes a pair of shearing blade end plates attached to said shearing blade ends.

13. The skimmer of claim 12 wherein each said frame side wall includes a pair of guide plates attached thereto, each said guide plate pair being space apart to slidably receive therebetween an end plate of said shearing blade apparatus.

14. The skimmer of claim 11 and further including means for mounting said skimmer to a motive power source.

15. The skimmer of claim 11 and further including means for alternately disposing said shearing blade in operational and non-operational positions.

16. The skimmer of claim 15 and further including means for alternately disposing said pushing blade in operational and non-operational positions.

17. The skimmer of claim 15 and further including means for alternately disposing said pushing blade in an operational position when said shearing blade is in its non-operational position and for disposing said pushing blade in its non-operational position when said shearing blade is in its operational position.

18. The skimmer of claim 15 wherein each of said frame side walls includes a bottom edge and further includes a skid plate attached to said bottom edge of said frame side wall.

19. The skimmer of claim 11 wherein said shearing blade further includes a top surface.

20. A skimmer comprising:

a frame including a pair of side walls;

a shearing blade apparatus including a shearing blade, said shearing blade mounted by said frame side walls for substantially vertical, reciprocal motion relative to said frame side walls and including a pair of ends and said shearing blade apparatus includes a pair of shearing blade end plates attached to said shearing blade ends; and a pushing blade apparatus including a pushing blade, said pushing blade mounted by said frame side walls for reciprocal pivotal motion relative to said frame side walls;

wherein each said frame side wall includes a pair of guide plates attached thereto, each said guide plate pair being space apart to slidably receive therebetween a shearing blade end plate.

21. The skimmer of claim 20 wherein said shearing blade comprises at least bottom, front and rear shearing blade surfaces and wherein the intersection of the front and bottom shearing blade surfaces provides a front cutting edge and the intersection of the rear and bottom shearing blade surfaces provides a rear cutting edge.

22. The skimmer of claim 20 wherein said shearing blade is positionable in the ground for shearing the soil above the blade from the soil beneath said blade to create a sheared soil layer while leaving the sheared soil layer substantially in place.

* * * * *